United States Patent [19]
Kaiser

[11] 3,992,803
[45] Nov. 23, 1976

[54] MOUSE TRAP
[76] Inventor: Robert Dennis Kaiser, 48775 Pontiac Trail, Wixom, Mich. 48096
[22] Filed: Mar. 20, 1975
[21] Appl. No.: 560,219

[52] U.S. Cl. ................................................ 43/83
[51] Int. Cl.² .................................... A01M 23/30
[58] Field of Search .................. 43/81, 83, 83.5, 82

[56] References Cited
UNITED STATES PATENTS
1,218,406  3/1917  Jackson ................................. 43/81
2,099,021  11/1937  Landes.................................... 43/81
2,684,553  7/1954  Schroeder............................. 43/81
FOREIGN PATENTS OR APPLICATIONS
179,305  5/1922  United Kingdom..................... 43/81

*Primary Examiner*—Warner H. Camp
*Attorney, Agent, or Firm*—Dale Austin Winnie

[57]  ABSTRACT

An enclosed passageway which provides a housing that is open at one end and has a back closure wall on which is mounted a trap mechanism that is capable of being both set and baited from outside the enclosed housing without handling the trap mechanism itself, and which is disposable or capable of having the entrapped and killed animal displaced therefrom without personal contact.

3 Claims, 9 Drawing Figures

U.S. Patent  Nov. 23, 1976  3,992,803
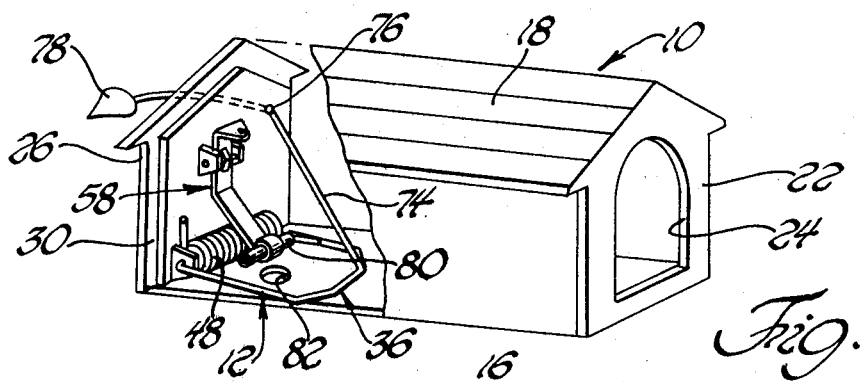
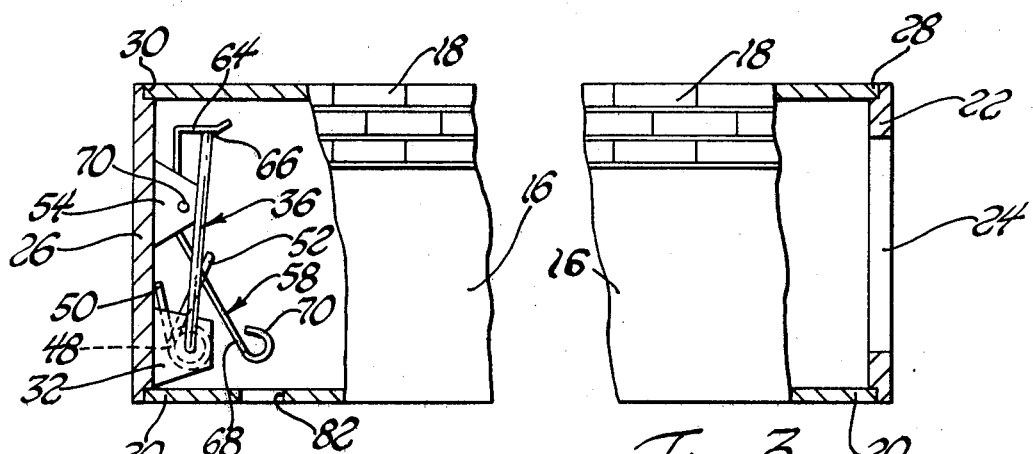
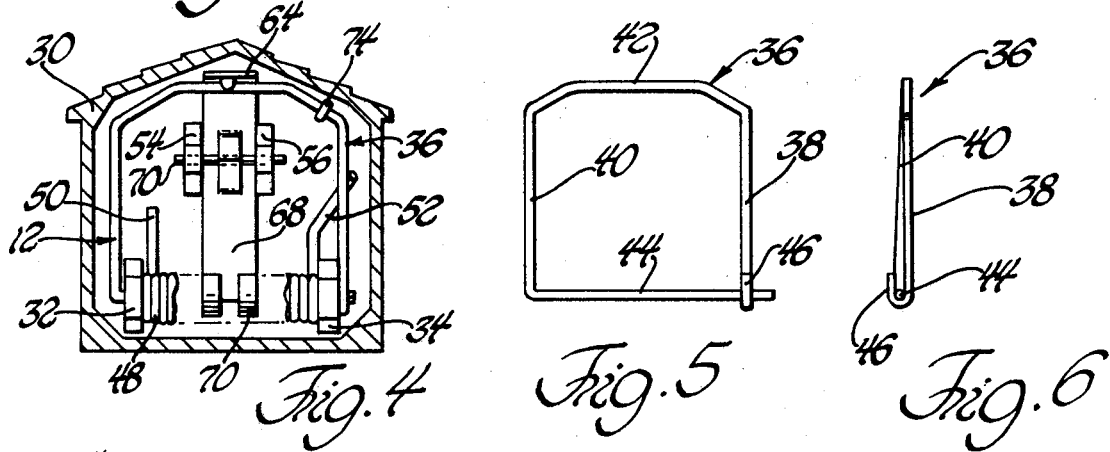
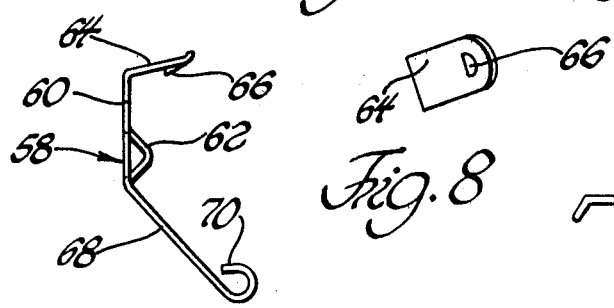

MOUSE TRAP

BACKGROUND OF THE INVENTION

One of the most commonly used traps for mice and rats includes a flat rectangular wooden base with a pivotally mounted and spring loaded bail which is held in a loaded condition by a wire rod engaged under a tripping device, that holds the trap bait, so that the bail is sprung when the bait is disturbed.

Although this type of trap is relatively inexpensive, it is dangerous to use in places where there are small children and pets, because it is so open and exposed. It is also very repulsive and unsightly when a mouse or rat is caught and killed in it. Another problem is that the open access available, from all sides, enables the bait to be approached from behind or otherwise inside the sweep of the bail wire and for smaller mice to take the bait without being caught or killed.

Although there are other types of traps, some of which catch rather than kill the small animals, there is always the problem of removing the mouse or rat from the trap, if it is to be used again, or throwing the whole trap away. And in every instance there is the problem of disposal before decomposition and resulting odors occur.

While there are also poisons and dehydrating tid-bits used to entice, catch and kill mice, rats and the like, these are dangerous to have around and can cause a dying mouse or rat to merely crawl into an inaccessible place with the same decomposition and odor problems.

SUMMARY OF THE PRESENT INVENTION

The present invention is a relatively simple and inexpensive trap for mice, rats and the like, which provides a total enclosure, with access from only one end thereof, a trap mechanism which is mounted on a back wall closure, and means for both baiting and loading, or unloading, the trap from externally thereof.

Essentially, a passageway member is provided, which in the preferred form for retail sales is in the shape of a small house, that is capable of being made as a one piece plastic extrusion. One end is receptive of a part that is formed to include a mouse-hole size opening for the only access to the housing, and the other end is completely closed by an end wall that has the trap mechanism pre-assembled and mounted thereon.

The trap mechanism includes the commonly known and used bail wire entrapment means, with a torsion spring to load it, but it is mounted on the back wall closure and is released to strike and catch a rodent, against the bottom wall of the housing enclosure, that approaches to take the bait in the trap.

The bail wire is loaded, against the bias of the torsion spring by a cable attachment that is threaded through a small access hole in the back wall closure suitable disposed to enable the bail wire to be drawn up against the back wall closure and to be engaged and held by the tripping device. Consequently, the trap can be set from outside the enclosure and without handling the bail wire or other trap mechanism parts. Also, by the use of a small finger grip member, such as a little red ball on the outer end of the bail setting cable means, a signal device is provided which serves to indicate when the trap is set and when it has been sprung.

An added feature is that the tripping device for the trap, which is also mounted on the back wall closure, includes a lower end to receive the trap bait and by the use of cotton waste or other absorbent material and a small access hole in the bottom wall of the enclosure, immediately under the lower disposed end of the tripping device, a few drops of a liquid bait may be introduced into the trap, onto the absorbent material, and agains without any direct handling and completely from outside the trap.

Although other than plastic material may be used, such as pressed paper board, except possibly for the back wall closure which supports the trap mechanism, the advantage of plastic is that it is more durable and can be readily cleaned and disinfected for reuse, if desired.

The obvious advantages, besides those mentioned, include having a relatively safe trap as regards small children and pets, since the trap mechanism is enclosed and inaccessable for inquisitive fingers or playful paws. It is also safer for the person required to handle and load the trap. And it is certainly more sanitary, and less-onerous to use, since the mouse or rat once caught and killed is contained and at the same time removed from sight.

DESCRIPTION OF THE DRAWING FIGURES

FIG. 1 is a perspective view of the mouse trap of the present invention with a side wall and roof section broken away to better show the inside back wall and trap mechanism.

FIG. 2 is a side plan view of the back end of the mouse trap, again with a part of the side wall and roof section broken away.

FIG. 3 is a side plan view of the front end of the mouse trap with part of the side wall and roof section broken away.

FIG. 4 is a front plan view of the back wall of the mouse trap, as seen from inside the housing enclosure, and showing the trap mechanism.

FIGS. 5 and 6 show the trap bail in front plan and side views, respectively.

FIG. 7 is a side view of the bail tripping member

FIG. 8 is a top view of the bail tripping member to show the manner in which it is staked to catch and hold the bail.

FIG. 9 is a side view of the torsion spring used in the mouse trap shown and disclosed in the previous drawing figures.

DESCRIPTION OF THE ILLUSTRATED EMBODIMENT

The particular mouse trap 10 which is shown in the drawing figures is in the form and shape of a small house which is made of molded plastic parts that are engaged and fastened together to provide an enclosure for a trap mechanism 12 therewithin.

The main body member 14 may be an extruded part, with open ends, formed to include side walls 16, a roof 18 and a bottom wall 20. This member is essentially to provide a passageway, and an enclosed space of sufficient length to receive and contain a mouse that has been induced to enter and get caught in the trap, so that the dead body will be out of sight. It is also sufficiently narrow to generally preclude much movement of a mouse entering the housing other than head-on movement towards the trap mechanism. And, in particular, to preclude any opportunity to approach the bait in the trap from the sides or behind, as will subsequently be more fully described.

The front end of the housing or passageway member 14 is provided with an end wall 22 which is provided with a mouse hole opening 24 that simulates an arched doorway.

The back end of the passageway member 14 is closed by an end wall 26 which has the trap mechanism 12 assembled and mounted thereon before it is fixed in place.

Both end wall members 22 and 26 will be noted in FIGS. 1-4 to include a shoulder stepped edge 28 and 30, respectively, which are formed and provided for fitted engagement and fastening of the opposite ends of the passageway member thereto, as by adhesive bonding, heat sealing or otherwise.

Referring now to the back wall member 26, this part will be noted as formed to include a pair of relatively spaced and outwardly projecting tabs 32 and 34, on the inner face of the wall and near its lower edge, which provide bearing support (subsequently heat sealed or pinched) for pivotal actuation of the bail wire 36 of the trap mechanism.

The bail wire 36 is best shown, by itself, in FIG. 5 as formed to include a closed loop with side arms 38 and 40, the cross wire 42 and the return end 44 which is engaged in a U-bend catch 46 at the lower disposed end of the one side arm 38; the latter being more clearly shown in FIG. 6.

A close wound torsion spring 48 is provided on the return end 44 of the bail wire, before it is hooked in the catch 46 and both are mounted on the back wall closure 26. An end view of the spring is shown in FIG. 9 but its operative disposition is best shown in FIG. 4.

The torsion spring 48 has a tang 50 at one end for back wall engagement and a longer tang 52 at the other end for engagement with the bail wire, as best shown in FIG. 4. As will be appreciated, when the bail wire 36 is drawn up and held near the back wall closure it is under the torsion load of the spring 48 and when tripped it is actuated to the position shown in FIG. 1.

A second pair of relatively spaced and outwardly projecting tabs 54 and 56 are also provided on the back wall closure member 26, relatively between the other two and higher up, for the pivotal support of the bail catching and tripping member 58. This member is best shown in plan and side views in FIGS. 4 and 7 to include a strap or band that is formed to provide a middle section part 60 that is staked to form hinge pin recess 62 and which has forwardly projecting upper end 64, with a bail wire catch 66 formed therein, and a lower disposed end 68 that extends forwardly and down and is forked and curled, as at 70, to receive and hold bait for the trap.

A pin 72 is journalled in the wall tabs 54 and 56 and extends through the hinge pin recess 62 so that the bail catching and tripping member is relatively free to swing thereon. And the lower disposed end 68, particularly when holding bait, is weighted so that the upper end 64 is disposed for interference engagement with the bail wire, when it is being loaded, to catch and hold the bail wire behind the catch 66.

As will be noted, the leading end of the forwardly projecting catch part 64 is bent up so that the bail wire will pass under and be hooked behind the catch 66, when the trap is being set.

Referring now to FIGS. 1 and 4, it will be noted that a light nylon or otherwise strong, flexible cable means 74 is fastened to the bail wire 36, on the cross rail and near the top of the side arm under the bias of the torsion spring, and is threaded through a small hole 76 in the back wall closure. The length of such cable means 74 is shown as slightly longer than is actually the case, or need be, in order to show a ball 78 provided on the outside end thereof for finger gripping purposes in pulling the bail wire into its loaded or set condition.

In actual practice the cable means need only be long enough to provide some slack when the trap is sprung and in having a somewhat shorter cable means than shown it will be appreciated that the free hanging condition of the finger grip ball 78 will serve to indicate a loaded and unsprung trap while a raised ball with signal that the trap has been sprung and caught its prey therewithin.

Of final note is the particular manner in which the present trap is baited:

Referring back to FIG. 1, a small roll 80 of cotton waste, or other absorbent material, is provided in the forked and curled end 70 of the bail catching and tripping member 58. And, a small hole 82 is provided through the bottom wall 20 of the housing part, immediately under the bait holding end of the tripping member, through which may be dispensed a few drops of a liquid substance considered to attract and entice mice and like small rodents into the trap.

The access hole 82 is relatively small and, as will be appreciated, is completely obscured when the trap is setting flat on its bottom wall.

To place the mouse trap 10 in use the finger gripping ball 78 is pulled to tighten the cable means 74 and draw the bail 36, against the resistance of the spring 48, up and back towards the back wall closure 26. The normally weighted end 68 of the bail catching and tripping member 58 causes the catch 66 to engage and hold the bail 36 after it passes thereunder and the tension on the cord of cable 74 is released.

It is then turned bottom side up so that liquid bait may be applied through the bottom wall hole 82 onto the cotton waste or other absorbent material 80 held in the forked and curled end 70.

The trap is no set and ready to be placed in a dark corner or wherever desired and intended to be used.

When a mouse enters the opening 24, and approaches the baited trap on the back wall closure, there is limited space and the scent of the bait permeates the enclosure. Consequently, the mouse is induced to and must approach head-on into the trap area and in taking the bait will have his head and neck area under the bail for a quick kill. The bail wire is purposely close fitting relative to the side walls of the housing enclosure to preclude any side access and there is no approach a mouse can make from behind or inside the bail wire due to the restricted space.

Once the trap is sprung it may be disposed of or reused by being reset and emptied over a waste receptacle.

From the foregoing, it has been shown that a small and relatively inexpensive mouse trap may be made and provided which is essentially self contained, can be baited and set without handling other than the outer housing part, and which is disposable and may be thrown away with the entrapped mouse, after it has served its intended purpose, and thereby avoids the unsightliness and distasteful chore otherwise involved in disposing of mouse and trap.

It may also be reused by simply holding the trap, open end down, over a trash receptical and resetting the bail wire, whereupon the dead mouse will drop out through the open end.

The trap is obviously safe for pets and small children since the trap mechanism is inaccessibly disposed on the back wall closure which is too far back for probing fingers and the mouse hole is purposely too small for a small hand or an animal's paw.

I claim:

1. A trap for mice and other rodents, comprising; a member for providing a passageway of sufficient length to receive and retain a rodent therewithin, a ground level access provided at one end of said passageway member and a back wall member provided at the other end and for closure thereof, a spring loaded bail wire trap mechanism mounted wholly upon said passageway, and said passageway member having enclosing and restrictive wall surfaces sufficiently closely spaced to preclude other than a frontal ground level approach by a rodent attracted into said passageway member and relatively towards said trap mechanism, said passageway member having upper, side and bottom walls providing said enclosing and restrictive wall surfaces and being formed to receive and retain said back wall member in fixed engagement therewith and with said trap mechanism pre-assembled and mounted thereon, said trap mechanism including a spring loaded bail wire pivotally mounted on said back wall member near the lower edge thereof, a bail wire catching and tripping member pivotally mounted on said back wall member and having a weighted end receptive of rodent attracting bait, an access hole through said back wall member and a cable connection through said hole and engaged to said bail wire for drawing said bail wire up against said back wall member and into catching engagement with said catching and tripping member, whereby said trap mechanism is wholly contained and provided upon said back wall member.

2. The trap of claim 1, the weighted end of said bail wire catching and tripping member having an absorbent material provided thereon, and the bottom wall of said passageway member having a liquid bait access hole provided therethrough for impregnating said absorbent material and thereby limiting the relative size of the baiting hole required.

3. The trap of claim 1, said cable connection being of sufficient length to hang freely outside said back wall when said trap mechanism is set and having means provided on the free end thereof for actuation thereof and visual indication of the tripped condition of said trap in the fore-shortening of said cable connection and consequent relocation thereof.

* * * * *